(12) United States Patent
Wang et al.

(10) Patent No.: US 12,019,517 B2
(45) Date of Patent: Jun. 25, 2024

(54) METHOD FOR REMOTE UPGRADE AND ROLLBACK OF UNMANNED AERIAL VEHICLE (UAV) SOFTWARE

(71) Applicant: XI'AN LYNCON TECHNOLOGY CO., LTD., Shaanxi (CN)

(72) Inventors: Zhong Wang, Shaanxi (CN); Hongxuan Guo, Shaanxi (CN); Xukai Wang, Beijing (CN); Xinghui Li, Shaanxi (CN); Chang Li, Shaanxi (CN); Jiangfeng Duan, Shaanxi (CN); Chenglin Wang, Shaanxi (CN); Yongfu Gao, Shaanxi (CN); Haonan Wang, Shaanxi (CN); Tengli Luo, Shaanxi (CN)

(73) Assignee: XI'AN LYNCON TECHNOLOGY CO., LTD., Shaanxi (CN)

( * ) Notice: Subject to any disclaimer, the term of this patent is extended or adjusted under 35 U.S.C. 154(b) by 0 days.

(21) Appl. No.: 17/623,587

(22) PCT Filed: Nov. 23, 2021

(86) PCT No.: PCT/CN2021/132531
§ 371 (c)(1),
(2) Date: Dec. 28, 2021

(87) PCT Pub. No.: WO2022/242080
PCT Pub. Date: Nov. 24, 2022

(65) Prior Publication Data
US 2024/0070026 A1   Feb. 29, 2024

(30) Foreign Application Priority Data

May 19, 2021   (CN) .......................... 202110543036.4

(51) Int. Cl.
*G06F 11/14*   (2006.01)
*G06F 8/65*   (2018.01)

(52) U.S. Cl.
CPC ............ *G06F 11/1433* (2013.01); *G06F 8/65* (2013.01); *G06F 2201/865* (2013.01)

(58) Field of Classification Search
USPC ..................................................... 717/170
See application file for complete search history.

(56) References Cited

U.S. PATENT DOCUMENTS

| | | | |
|---|---|---|---|
| 10,399,706 B1 * | 9/2019 | Hanlon | ..................... G06N 5/02 |
| 2006/0253695 A1 * | 11/2006 | Chen | ..................... G06F 9/4401 |
| | | | 713/2 |
| 2012/0210312 A1 * | 8/2012 | Ma | ........................... G06F 8/65 |
| | | | 717/170 |

(Continued)

FOREIGN PATENT DOCUMENTS

| CN | 1719413 A | 1/2006 |
|---|---|---|
| CN | 1889041 A | 1/2007 |

(Continued)

*Primary Examiner* — Qing Chen
*Assistant Examiner* — Clint Thatcher
(74) *Attorney, Agent, or Firm* — Samson G. Yu

(57) ABSTRACT

The disclosure proposes a method for remote upgrade and rollback of Unmanned Aerial Vehicle (UAV) software. The UAV includes a storage area and a UAV software upgrade module; and the storage area is divided into a main storage area, a backup storage area and a data area.

9 Claims, 8 Drawing Sheets

(56) References Cited

U.S. PATENT DOCUMENTS

| | | | |
|---|---|---|---|
| 2015/0220326 A1* | 8/2015 | Jia | G06F 8/658 |
| | | | 717/170 |
| 2015/0277897 A1 | 10/2015 | Deng | |
| 2017/0206079 A1 | 7/2017 | Zhang | |
| 2017/0212746 A1 | 7/2017 | Quin et al. | |
| 2019/0042227 A1* | 2/2019 | Sharma | G06F 8/65 |
| 2019/0135434 A1* | 5/2019 | Zhang | G08G 5/006 |
| 2019/0205116 A1* | 7/2019 | Chen | G06F 8/65 |
| 2020/0331604 A1* | 10/2020 | Yamine | B64C 39/024 |
| 2021/0149661 A1* | 5/2021 | Li | B64F 5/40 |
| 2021/0326127 A1* | 10/2021 | Hieb | B64C 39/024 |
| 2022/0083326 A1* | 3/2022 | Du | G06F 8/65 |

FOREIGN PATENT DOCUMENTS

| | | |
|---|---|---|
| CN | 102023876 A | 4/2011 |
| CN | 104156249 A | 11/2014 |
| CN | 106569847 A | 4/2017 |
| IN | 108549539 A | 9/2018 |

* cited by examiner

METHOD FOR REMOTE UPGRADE AND ROLLBACK OF UNMANNED AERIAL VEHICLE (UAV) SOFTWARE

CROSS-REFERENCE TO RELATED APPLICATION

The disclosure claims priority to Chinese Patent Application No. 202110543036.4, filed to the China National Intellectual Property Administration on May 19, 2021 and entitled "Method for Remote Upgrade and Rollback of UAV Software", the disclosure of which is hereby incorporated by reference in its entirety.

TECHNICAL FIELD

The disclosure belongs to the technical field of Unmanned Aerial Vehicles (UAV), relating to software upgrade, and in particular to a method for remote upgrade and rollback of UAV software.

BACKGROUND

Due to its high maneuverability and low cost, an Unmanned Aerial Vehicle (UAV), also commonly known as an unmanned aircraft or a remotely piloted aircraft, has been widely used in the past few decades.

Due to the changeable use environment of the UAV, improvement of the diversity of UAV control functions and constant improvement of user experience, it is necessary to upgrade UAV software.

When existing UAV software is updated, the UAV needs to be disassembled on the spot by personnel of a UAV manufacturer, and related hardware devices are connected with cables to perform upgrade, which leads to low upgrading efficiency and high maintenance cost. The remote upgrade technology may update a software version by pushing the software version remotely, without affecting the normal use of the UAV to the maximum extent. The risk of on-site upgrade and the uncontrollable cost are avoided.

Although there are many researches on remote upgrade of software in a traditional art, there is little research on remote upgrade of UAV software. In addition, when there is an error in transmission, an error in file copy or an emergency during the upgrade process, there is no solution to ensure that the UAV can still work normally. Therefore, it is imperative to design a method for remote upgrade and rollback of UAV software.

SUMMARY

A method for remote upgrade and rollback of UAV software includes: The UAV includes a storage area and a UAV software upgrade module; and the storage area is divided into a main storage area, a backup storage area and a data area;

The main storage area and the backup storage area are both configured to store software required for normal operation of the UAV and store respectively the software of a same version, and the UAV software upgrade module only performs an upgrade operation on the software in the backup storage area;

The data area is configured to store various data generated during an upgrade task of the UAV, and any process is capable of performing reading and writing operation.

The upgrade operation in the backup storage area may specifically include the following steps:

Block 1, the UAV software upgrade module receives an upgrade instruction from a ground station, confirms information of software of a upgrade version and version information of the software in a current backup area, and sends a confirmation result to the ground station; and if the upgrade is determined, a temporary version area is divided from the data area.

The temporary version area is configured to store the software of the upgrade version and software of an old version, and such partition may be revoked after the upgrade task is completed.

Block 2, the UAV software upgrade module receives the software of the upgrade version sent from the ground station, and the software of the upgrade version in the temporary version area for data check; if the check result is wrong, the software of the upgrade version is deleted and the result is fed back to the ground station; and if the check result is correct, the upgrade module writes the software of the old version in the backup storage area into the temporary version area, writes the software of the upgrade version into the backup storage area to cover the software of the old version, changes the main storage area into the backup storage area, and changes the backup storage area into the main storage area.

Block 3, the UAV is re-powered and started for a power-on Built In Test (BIT); if the test is wrong, the rollback operation is performed; and if the test is correct, steps of Block 1-Block 2 are repeated to upgrade and test the software of the old version in the current backup storage area, the result after the test is correct is fed back to the ground station, and the temporary version area is deleted, so that the upgrade is completed.

The specific content of the disclosure will be further explained in detail in combination with embodiments below.

DETAILED DESCRIPTION OF THE EMBODIMENTS

It is to be noted that the English full name of CRC in the disclosure is Cyclic Redundancy Check, which means cyclic redundancy check.

It is to be noted that the English full name of BIT in the disclosure is Built In Test, which means built in test.

It is to be noted that the cost-benefit ratio in the disclosure is the ratio of input cost to output benefit.

It is to be noted that all parts and components in the disclosure adopt parts and components known in the field unless otherwise specified.

Specific embodiments of the disclosure are given below. It is to be noted that the disclosure is not limited to the following specific embodiments, and all equivalent transformations made based on the technical solutions of the disclosure shall fall within the scope of protection of the disclosure.

EMBODIMENTS

Figure 1:
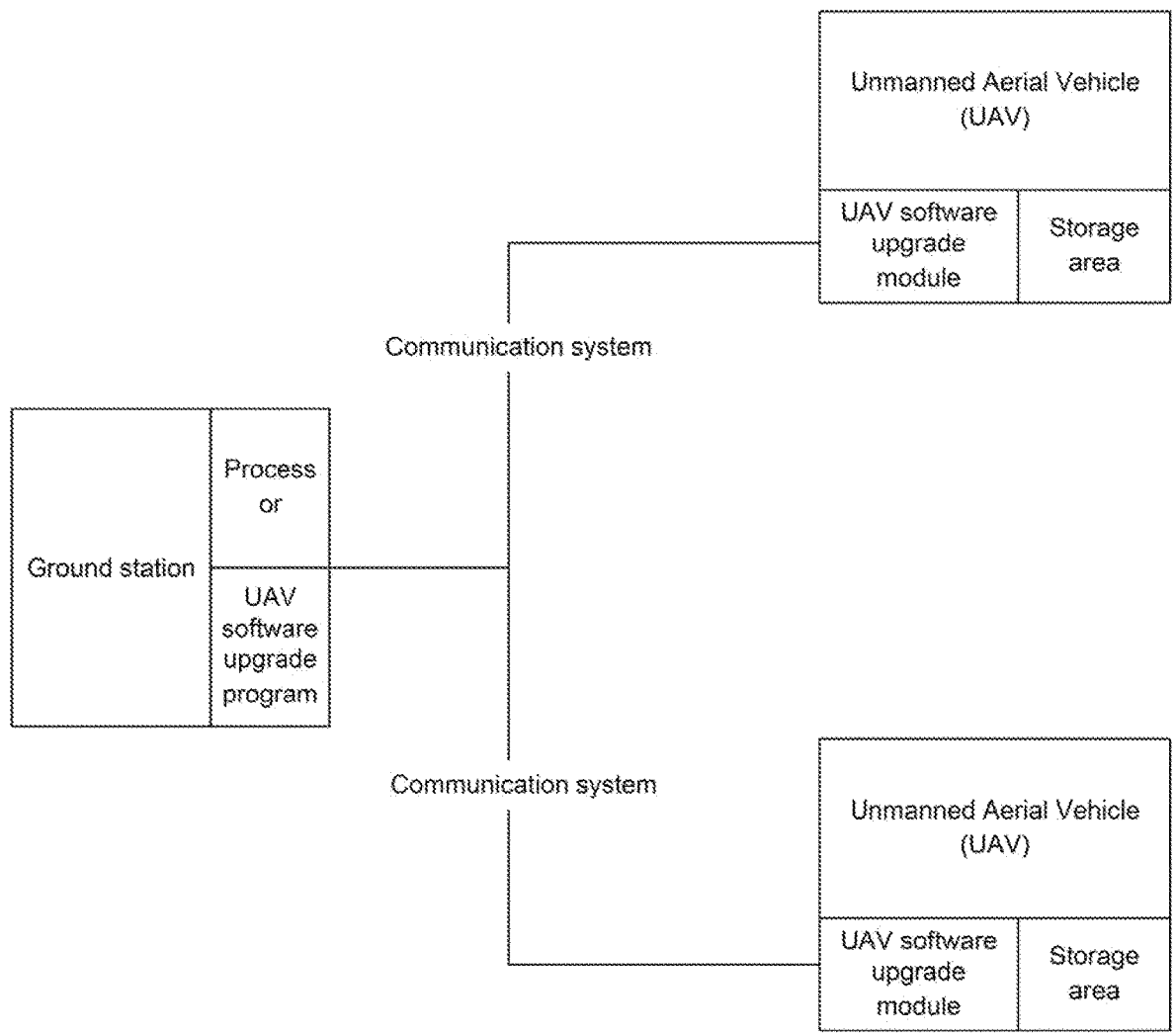
FIG. 1 is a block diagram of composition of an upgrade system in the disclosure.
Figure 2:
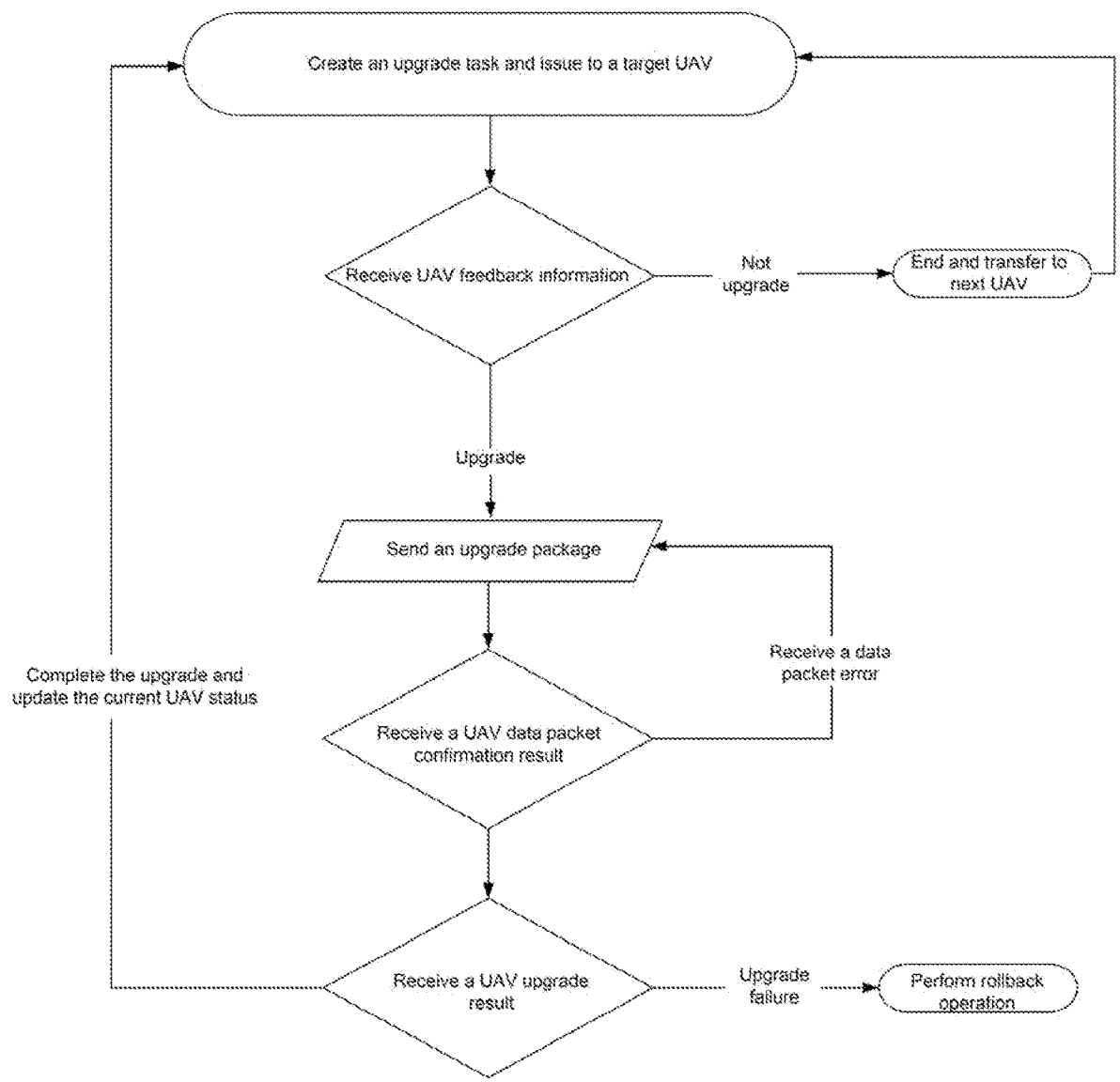
FIG. 2 is a working flowchart of a ground station in the disclosure.

The embodiment proposes a method for remote upgrade and rollback of UAV software, which includes the following steps as shown in FIG. 2.

The UAV includes a storage area and a UAV software upgrade module; and the storage area is divided into a main storage area, a backup storage area and a data area.

The main storage area and the backup storage area are both configured to store software required for normal operation of the UAV and store respectively the software of a same version, and the UAV software upgrade module only performs upgrade operation on the software in the backup storage area.

The data area is configured to store various data generated during an upgrade task of the UAV, and any process is capable of perform reading and writing operation.

The upgrade operation in the backup storage area specifically includes the following steps.

At Block 1, the UAV software upgrade module receives an upgrade instruction from a ground station, confirms information of software of an upgrade version and version information of the software in a current backup area, and sends a confirmation result to the ground station; and if the upgrade is determined, a temporary version area is divided from the data area.

The temporary version area is configured to store the software of the upgrade version and software of an old version, and such partition may be revoked after the upgrade task is completed.

In the embodiment, due to the change of customer requirements, the UAV software needs to be upgraded, and maintenance personnel remotely control the ground station through the network to remotely upgrade the software.

The maintenance personnel send the software of the upgrade version to the ground station through the network, and the ground station sends the upgrade task to a target UAV. The UAV software upgrade module receives the task and compares the versions, confirms whether to upgrade or not, feeds back a result to the ground station, and divides the temporary version area from the data area.

Figure 3:
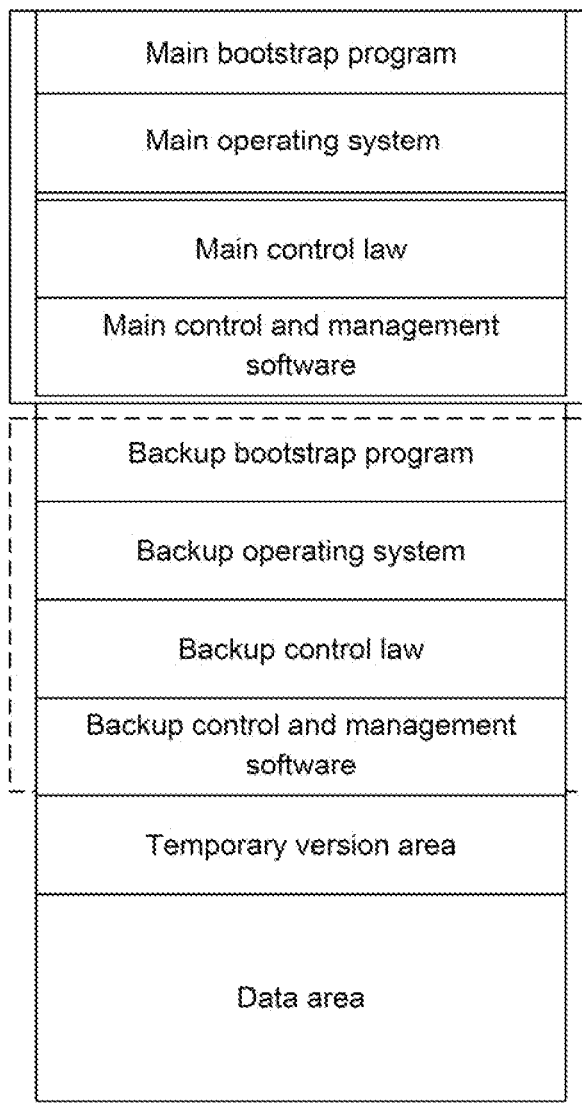
FIG. 3 is a schematic diagram of division of an Unmanned Aerial Vehicle (UAV) storage area in the disclosure.
Figure 4:
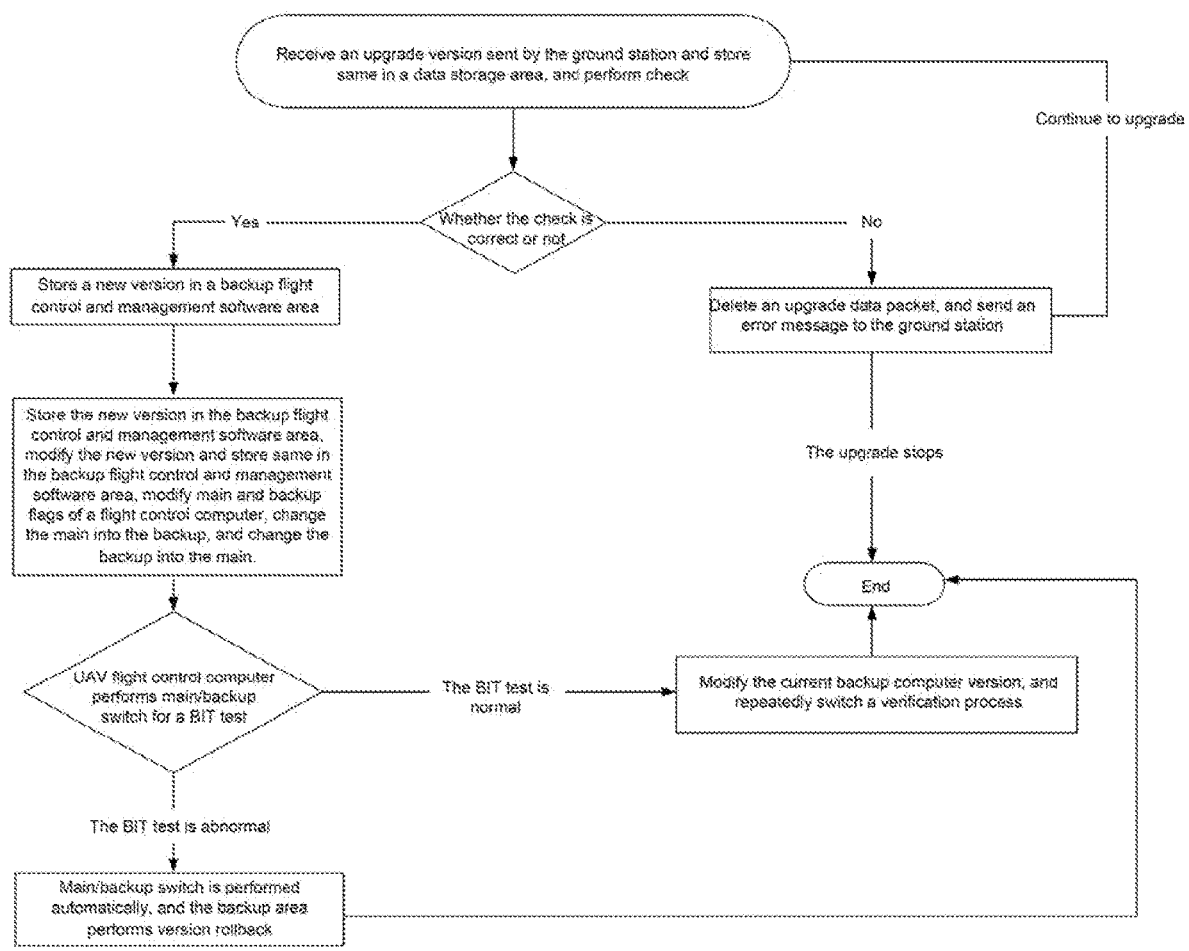
FIG. 4 is a flowchart of software upgrade of a UAV in the disclosure.
Figure 5:
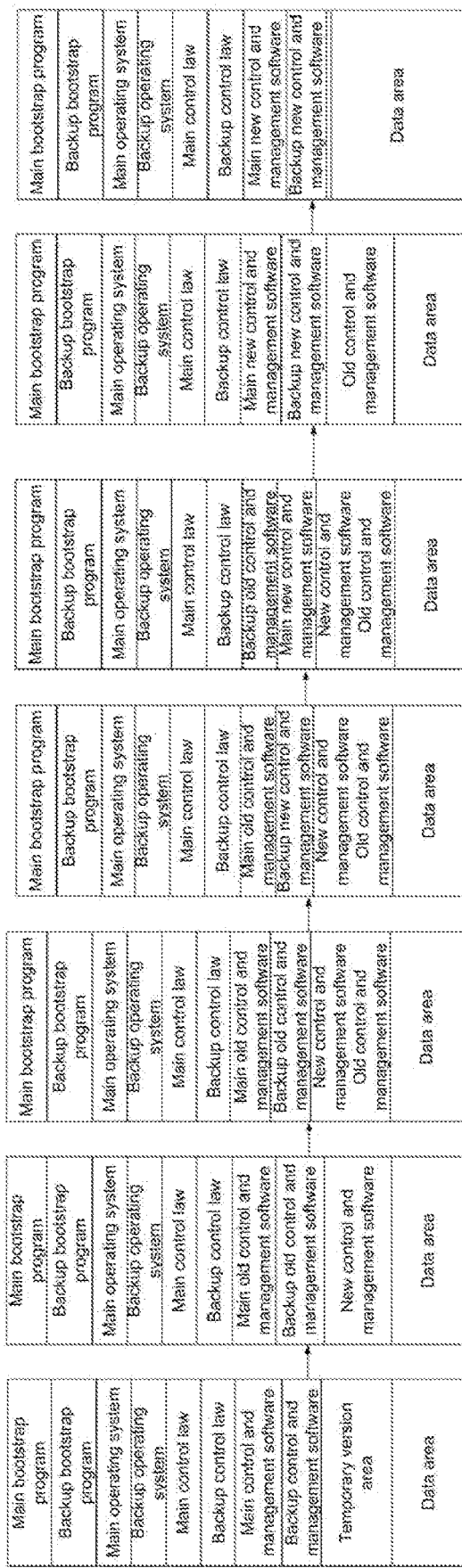
FIG. 5 is a variation diagram of UAV software version in the disclosure.
Figure 6:
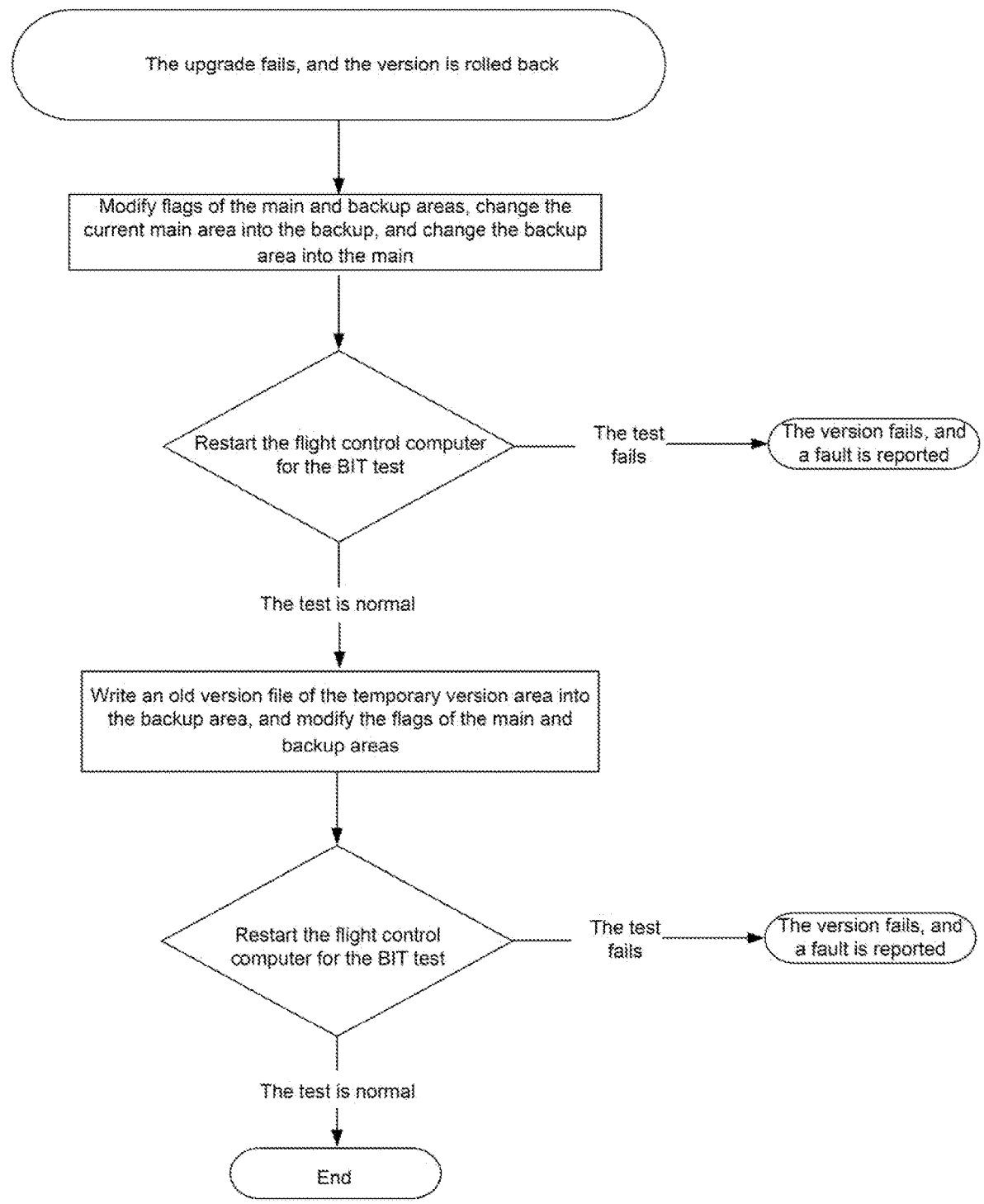
FIG. 6 is a flowchart of UAV software rollback in the disclosure.
Figure 7:
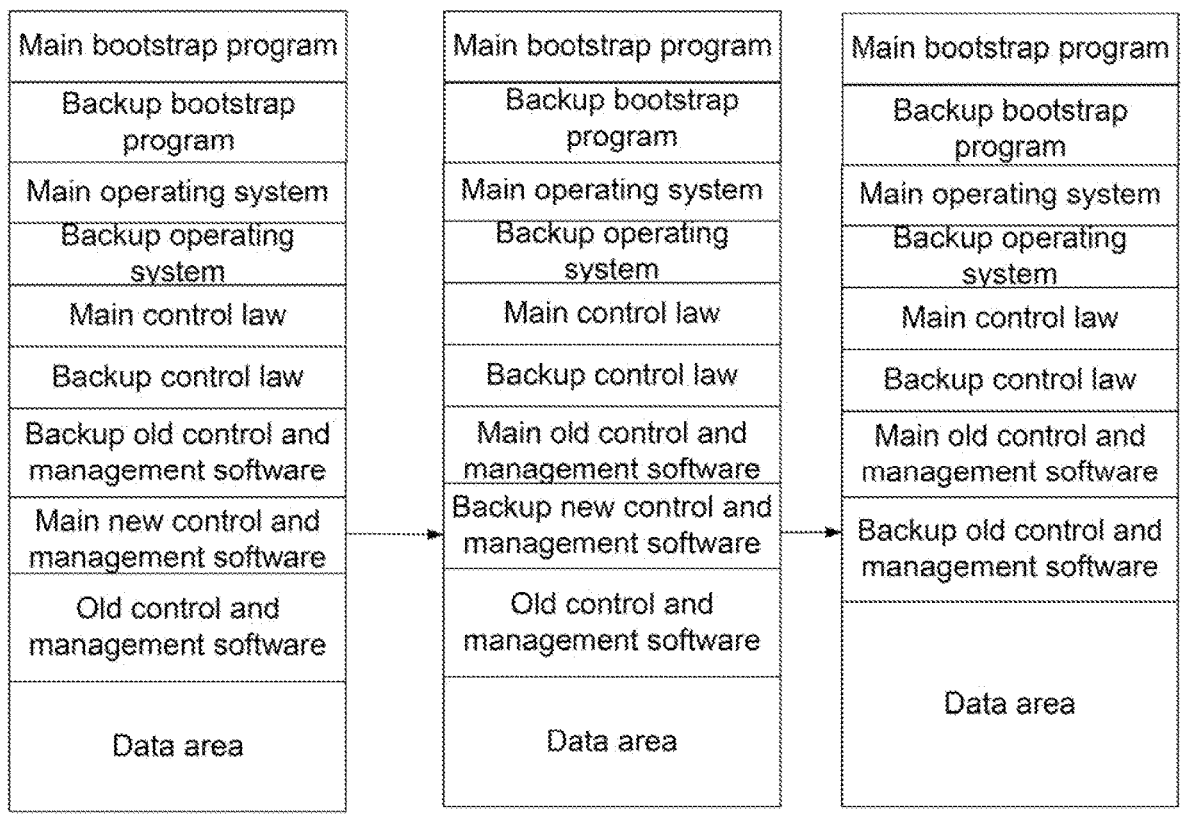
FIG. 7 is a variation diagram of software version during UAV software rollback in the disclosure.

Taking a commonly-used UAV as an example, the storage area is designed to be divided into 10 areas, which are a main bootstrap program area, a backup bootstrap program area, a main operating system area, a backup operating system area, a main control law area, a backup control law area, a main control and management software area, a backup control and management software area, the temporary version area and the data area, as shown in FIG. 3.

The main bootstrap program area and the backup bootstrap program area store system bootstrap programs. Herein, the versions of the bootstrap programs stored in the main and backup bootstrap program areas are the same, and main and backup programs are determined by partition flags. The storage space meets the storage, and upgrade requirements (for example, if the bootstrap program is 1M, the storage area is divided slightly larger, which is 1.5M), and except the upgrade module, other processes in the main and backup bootstrap program areas cannot perform the writing operation.

The main operating system area and the backup operating system area store operating system files. Herein, the versions of the operating systems stored in the main and backup operating system areas are consistent, and the storage space meets the storage requirements. Main and backup operating systems are determined by partition flags. Except the upgrade module, other processes cannot perform the writing operation.

The main control law area and the backup control law area store UAV control laws. Herein, the versions of control laws stored in the main and backup control law areas are the same, and the storage space meets the storage requirements. The main and backup control laws are determined by partition flags. Any process (including the software upgrade module) cannot perform writing operation.

The main control and management software area and the backup control and management software area store control and management software. Herein, the versions of main and backup control and management software are consistent, and the storage space meets the storage requirements. The main control and management software and the backup control; and management software are determined by partition flags. Except the upgrade module, other processes cannot perform the writing operation.

The temporary version area is configured to temporarily store upgraded and rolled-back versions. The storage space is allocated according to the size of the software of the upgrade version, which is three times or more of the version storage space (for example, if the upgrade program is 1M, the size of the temporary version area is 3M). Such area is a temporary area, which is temporarily divided by the upgrade module in the data area, and is revoked after version upgrade is completed. Only the upgrade module may perform the reading and writing operation on the temporary version area during the version upgrade.

The data area is configured to store various data generated during the upgrade task of the UAV, and any process may perform the reading and writing operation.

At Block 2, the UAV software upgrade module receives the software of the upgrade version sent from the ground station, and the software of the upgrade version in the temporary version area for data check; if the check result is wrong, the software of the upgrade version is deleted and the result is fed back to the ground station; and if the check result is correct, the upgrade module writes the software of the old version in the backup storage area into the temporary version area, writes the software of the upgrade version into the backup storage area to cover the software of the old version, changes the main storage area into the backup storage area, and changes the backup storage area into the main storage area.

In the embodiment, the ground station receives upgrade feedback and sends the software of the upgrade version to the UAV. The UAV upgrade module stores the software of the upgrade version in the temporary version area, calculates a check value after receiving the software of the upgrade version, and compares the calculated check value with a file check value in the upgrade version to judge whether the software of the upgrade version is transmitted correctly. A version check result is sent to the ground station.

If the version check is wrong, the ground station resends the software of the upgrade version and repeats the previous step. If the upload check fails for several times (less than or equal to 3), the upgrade operation is suspended and related problems are checked.

If the version check is correct, the UAV software upgrade module writes the version of the backup version area into the temporary version area (different from a new version in position), and writes the new version of the temporary version area into the backup control and management software area. The upgrade module modifies area flags. The main storage area is flagged as backup, and the backup storage area is flagged as main. The UAV is re-powered.

At Block 3, the UAV is re-powered and started for a power-on Built In Test (BIT); if the test is wrong, the rollback operation is performed; and if the test is correct, steps of Block 1-Block 2 are repeated to upgrade and test the software of the old version in the current backup storage area, the result after the test is correct is fed back to the ground station, and the temporary version area is deleted, so that the upgrade is completed.

In the embodiment, after the UAV is powered on, it calls the software to run from the main storage area to start the power-on BIT test. If the BIT is correct, the UAV software upgrade module repeats the above steps and continues to perform version upgrade on the backup area. After the upgrade is completed, the test is performed. If the test is correct, the temporary version area is revoked, upgrade success confirmation is sent to the ground station, and the ground station flags that the current UAV is successfully upgraded and the next UAV is upgraded.

If the BIT is incorrect after the software upgrade, the UAV software upgrade module sends unsuccessful version upgrade information to the ground station, and performs the rollback operation automatically. The software upgrade module modifies the partition flag, and a flight control computer is re-powered for the BIT test. If the test result is correct, the partition flag is modified, and the current backup storage area is subjected to the rollback operation. If the test is incorrect, an error message is returned to the ground station for troubleshooting.

The disclosure is a method for upgrading the UAV software by remote upgrade, which improves the efficiency of upgrading the UAV software and saves the upgrade cost. The upgrade process does not affect the current operation of the UAV, and at the same time, a safeguard mechanism is maintained. If the upgrade is unsuccessful, an original version may be returned to, which does not cause the unavailability of the UAV due to the upgrade.

As a preferred solution of the embodiment, the rollback operation includes the following steps.

At S1, the UAV software upgrade module changes the main storage area of a current upgrade program into the backup storage area, changes the backup storage area into the main storage area, and re-powers the UAV for the power-on BIT test; if the test is correct, the UAV software upgrade module writes a program of an old version in a temporary version area into the backup storage area corresponding to the current upgrade program; and if the test is wrong, it means that the UAV is out of order and it is necessary to check the UAV fault.

At S2, the UAV software upgrade module modifies main/backup flags of the storage area of the current upgrade program, changes the main storage area corresponding to the current upgrade program into the backup storage area, changes the backup storage area into the main storage area, and re-powers the UAV for the power-on BIT test; if the test is correct, the temporary version area is deleted, and the current software upgrade process is ended; and if the test is wrong, it means that the current UAV is out of order and it is necessary to check the UAV fault.

As a preferred solution of the embodiment, the upgrade instruction includes a UAV recognition code, an upgrade software type, software version information and storage space required by the software.

As a preferred solution of the embodiment, data check refers to performing CRC check first, comparing a calculated CRC check value with the CRC check value in an upgrade file, determining, if both are consistent, that the upgrade file is correct, and sending a confirmation result of whether the upgrade file is successfully received to the ground station.

As a preferred solution of the embodiment, the ground station includes one or more processors and a UAV software upgrade program.

As a preferred solution of the embodiment, the main storage area includes a main bootstrap program area, a main operating system area, a main control law area and a main control and management software area; and the backup storage area includes a backup bootstrap program area, a backup operating system area, a backup control law area and a backup control and management software area.

As a preferred solution of the embodiment, during the upgrade operation, new control and management software configured for storage in the temporary version area is configured to store old control and management software at the end of the upgrade, and the temporary version area is deleted after the upgrade operation.

As a preferred solution of the embodiment, during the rollback operation, the temporary version area is configured to store the old control and management software, and the temporary version area is deleted after the rollback operation.

As a preferred solution of the embodiment, the storage area is divided by function; the main storage area includes a main operating system, main user software and a main driver; and the backup storage area includes a backup operating system, backup user software and a backup driver.

Figure 8:
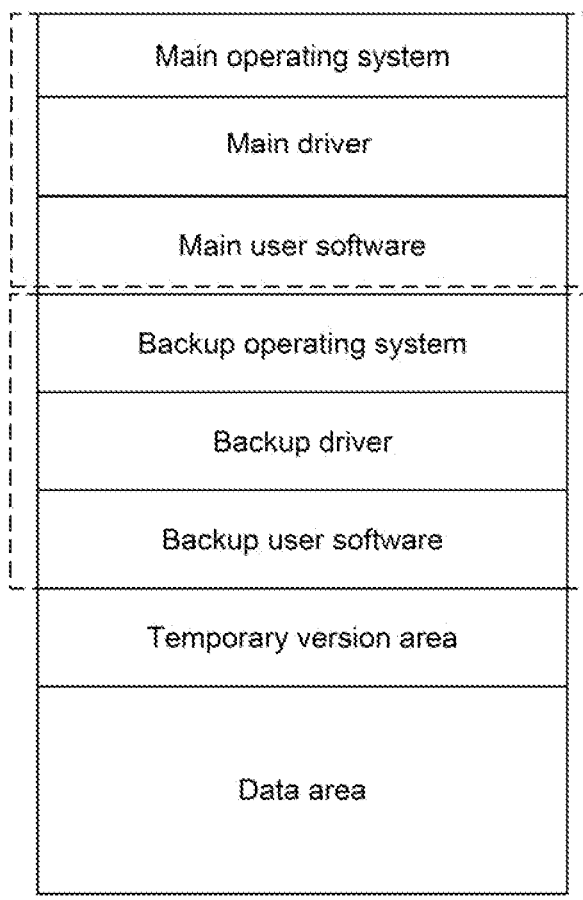
FIG. 8 is a schematic diagram of another division of a UAV storage area in the disclosure.

In the embodiment, as shown in FIG. 8, it is another division mode of the storage area.

Industrial Practicability

The disclosure is applicable to the field of Unmanned Aerial Vehicle (UAV) control. In the embodiments of the disclosure, a storage area is partitioned, so that the UAV can not only perform an upgrade task, but also keep working normally, without interrupting the current task of the UAV. Compared with a traditional disassembling and upgrading method, cumbersome operation of a disassembling device is effectively avoided, and the risk of damaging the UAV device is avoided. In addition, in the case that the UAV is upgraded abnormally or fails due to external uncontrollable factors (such as sudden power failure, etc.) during upgrade, the software of an old version can still be used to work again without causing equipment paralysis through rollback operation, which effectively ensures the robustness of the upgrade process and solves the technical problem of low cost-benefit ratio of UAV software upgrade in the traditional art.

What is claimed is:

1. A method for remote upgrade and rollback of Unmanned Aerial Vehicle (UAV) software, comprising:
the UAV comprising a storage area and a UAV software upgrade module, dividing the storage area into a main storage area, a backup storage area and a data area, wherein the main storage area and the backup storage area are both configured to store software required for normal operation of the UAV and store respectively the software of a same version, the UAV software upgrade module only performs an upgrade operation on the software in the backup storage area, the data area is configured to store various data generated during an upgrade task of the UAV, and any process is capable of performing reading and writing operation, the upgrade operation in the backup storage area specifically comprises the following steps:

Block 1, receiving, by the UAV software upgrade module, an upgrade instruction sent from a ground station, confirming information of software of a upgrade version and version information of the software in a current backup area, and sending a confirmation result to a ground station; if the upgrade is determined, dividing a temporary version area from the data area, based on the upgrade instruction, which comprises storage space required by the software of the upgrade version;

the temporary version area is configured to store the software of the upgrade version and software of an old version, only the upgrade module may perform the reading and writing operation on the temporary version area during a version upgrade, and such partition being revoked after the upgrade task is completed;

Block 2, receiving, by the UAV software upgrade module, the software of the upgrade version sent from the ground station, and storing the software of the upgrade version in the temporary version area for data check; if the check result is wrong, deleting the software of the upgrade version and feeding back the result to the ground station; if the check result is correct, writing, by the upgrade module, the software of the old version in the backup storage area into the temporary version area, writing the software of the upgrade version into the backup storage area to cover the software of the old version by the upgrade module, changing the main storage area into the backup storage area, and changing the backup storage area into the main storage area; and Block 3, re-powering and starting the UAV for the power-on BIT test, if the test is wrong, performing a rollback operation, if the test is correct, repeating steps of Block 1-Block 2 to upgrade and test the software of the old version in the current backup storage area, feeding back a result to the ground station after the test is correct, and deleting the temporary version area, so that the upgrade operation is completed.

2. The method for remote upgrade and rollback of UAV software according to claim 1, wherein the rollback operation comprises:

S1, changing, by the UAV software upgrade module, the main storage area of a content upgrade program into the backup storage area, changing the backup storage area into the main storage area, and re-powering the UAV for a power-on Built In Test (BIT); if the test is correct, writing, by the UAV software upgrade module, a program of an old version in a temporary version area into the backup storage area corresponding to the current upgrade program, and if the test is wrong, it means that the UAV is out of order and it is necessary to check the UAV fault;

and S2, modifying, by the UAV software upgrade module, main/backup flags of the storage area of the current upgrade program, changing the main storage area corresponding to the current upgrade program into the backup storage area, changing the backup storage area into the main storage area, and re-powering the UAV for the power-on BIT test; deleting the temporary version area and ending a current software upgrade process if the test is correct, and it means that the current UAV is out of order and it is necessary to check the UAV fault if the test is wrong.

3. The method for remote upgrade and rollback of UAV software according to claim 1, wherein an upgrade instruction comprises a UAV recognition code, an upgrade software type, software version information and storage space required by the software.

4. The method for remote upgrade and rollback of UAV software according to claim 1, wherein data check refers to performing Cyclic Redundancy Check (CRC) first, comparing a calculated CRC check value with a CRC check value in an upgrade file, if both are consistent, determining the upgrade file is correct, and sending a confirmation result of whether the upgrade file is successfully received to a ground station.

5. The method for remote upgrade and rollback of UAV software according to claim 1, wherein a ground station comprises one or more processors and a UAV software upgrade program.

6. The method for remote upgrade and rollback of UAV software according to claim 1, wherein the main storage area comprises a main bootstrap program area, a main operating system area, a main control law area and a main control and management software area, the backup storage area comprising a backup bootstrap program area, a backup operating system area, a backup control law area and a backup control and management software area.

7. The method for remote upgrade and rollback of UAV software according to claim 1, wherein during the upgrade operation, a new control and management software configured for storage in the temporary version area is configured to store an old control and management software at the end of the upgrade, and deleting the temporary version area after the upgrade operation.

8. The method for remote upgrade and rollback of UAV software according to claim 2, wherein during the rollback operation, the temporary version area is configured to store an old control and management software, and deleting the temporary version area after the rollback operation.

9. The method for remote upgrade and rollback of UAV software according to claim 1, wherein the storage area is divided by function, the main storage area comprising a main operating system, main user software and a main driver, and the backup storage area comprising a backup operating system, backup user software and a backup driver.

* * * * *